US012056046B2

(12) United States Patent
Drissi et al.

(10) Patent No.: US 12,056,046 B2
(45) Date of Patent: Aug. 6, 2024

(54) CORRUPTED STORAGE PORTION RECOVERY IN A MEMORY DEVICE

(71) Applicant: Micron Technology, Inc., Boise, ID (US)

(72) Inventors: Lalla Fatima Drissi, Ottaviano (IT); Giuseppe D'Eliseo, Caserta (IT); Paolo Papa, Naples (IT); Massimo Iaculo, San Marco Evangelista (IT); Carminantonio Manganelli, Benevento (IT)

(73) Assignee: Micron Technology, Inc., Boise, ID (US)

( * ) Notice: Subject to any disclaimer, the term of this patent is extended or adjusted under 35 U.S.C. 154(b) by 195 days.

(21) Appl. No.: 17/136,819

(22) Filed: Dec. 29, 2020

(65) Prior Publication Data

US 2021/0200672 A1 Jul. 1, 2021

Related U.S. Application Data

(60) Provisional application No. 62/955,001, filed on Dec. 30, 2019.

(51) Int. Cl.
*G06F 12/02* (2006.01)
*G06F 3/06* (2006.01)

(52) U.S. Cl.
CPC ........ *G06F 12/0253* (2013.01); *G06F 3/0614* (2013.01); *G06F 3/0647* (2013.01); *G06F 3/0679* (2013.01)

(58) Field of Classification Search
CPC .. G06F 12/0253; G06F 3/0614; G06F 3/0647; G06F 3/0679
USPC ......................................................... 707/813
See application file for complete search history.

(56) References Cited

U.S. PATENT DOCUMENTS

| 11,175,984 B1* | 11/2021 | Lercari | G06F 11/0784 |
| 2004/0225943 A1* | 11/2004 | Brueggen | H03M 13/01 |
| | | | 714/758 |
| 2012/0159289 A1* | 6/2012 | Piccirillo | G06F 11/1441 |
| | | | 714/799 |
| 2013/0067179 A1* | 3/2013 | Paleologu | G06F 11/1076 |
| | | | 711/159 |

(Continued)

FOREIGN PATENT DOCUMENTS

CN 113127386 7/2021

*Primary Examiner* — Hosain T Alam
*Assistant Examiner* — Saba Ahmed
(74) *Attorney, Agent, or Firm* — Schwegman Lundberg & Woessner, P.A.

(57) ABSTRACT

Devices and techniques for corrupted storage portion recovery in a memory device are described herein. A failure event can be detected during a garbage collection operation on a collection of storage portions (e.g., pages) in a memory array. Here, members of the collection of storage portions are being moved from a former physical location to a new physical location by the garbage collection operation. A reference to a former physical location of a possibly corrupt storage portion in the collection of storage portions can be retrieved in response to the failure event. Here, the possibly corrupt storage portion has already been written to a new physical location as part of the garbage collection operation. The possibly corrupt storage portion can then be rewritten at the new physical location using data from the former physical location.

24 Claims, 10 Drawing Sheets

(56) References Cited

U.S. PATENT DOCUMENTS

| | | | |
|---|---|---|---|
| 2014/0040550 A1* | 2/2014 | Nale | G06F 13/1694 |
| | | | 711/118 |
| 2017/0047124 A1* | 2/2017 | Ellis | G11C 16/3459 |
| 2017/0123946 A1* | 5/2017 | Wu | G06F 11/1441 |
| 2019/0042407 A1* | 2/2019 | Gao | G06F 3/0688 |
| 2019/0361772 A1* | 11/2019 | Koltsidas | G06F 11/1068 |
| 2020/0034307 A1* | 1/2020 | Duzly | G06F 12/0246 |
| 2020/0042440 A1* | 2/2020 | Hsiao | G06F 3/0679 |

\* cited by examiner

|  | DIE 0 | | DIE 1 | |
|---|---|---|---|---|
|  | PLANE 0 | PLANE 1 | PLANE 0 | PLANE 1 |
| PAGELINE 0 | PAGE 0 / SPARE AREA OF PAGE | PAGE 1 / SPARE AREA OF PAGE | PAGE 2 / SPARE AREA OF PAGE | PAGE 3 / SPARE AREA OF PAGE |
| PAGELINE 1 | PAGE 4 / SPARE AREA OF PAGE | PAGE 5 / SPARE AREA OF PAGE | PAGE 6 / SPARE AREA OF PAGE | PAGE 7 / SPARE AREA OF PAGE |
| PAGELINE 2 | PAGE 8 / SPARE AREA OF PAGE | PAGE 9 / SPARE AREA OF PAGE | PAGE 10 / SPARE AREA OF PAGE | PAGE 11 / SPARE AREA OF PAGE |
| PAGELINE 3 | PAGE 12 / SPARE AREA OF PAGE | PAGE 13 / SPARE AREA OF PAGE | PAGE 14 / SPARE AREA OF PAGE | PAGE 15 / SPARE AREA OF PAGE |

CORRUPTED STORAGE PORTION RECOVERY IN A MEMORY DEVICE

CLAIM OF PRIORITY

This patent application claims the benefit of priority, under 35 U.S.C. § 119, to U.S. Provisional Application Ser. No. 62/955,001, titled "CORRUPTED STORAGE PORTION RECOVERY IN A MEMORY DEVICE" and filed on Dec. 30, 2019, the entirety of which is hereby incorporated by reference herein.

TECHNICAL FIELD

Embodiments described herein generally relate to recovering data from a memory device. The examples below generally address data corruption caused when valid data from a block is being moved to another block during garbage collection.

BACKGROUND

Memory devices are typically provided as internal, semiconductor, integrated circuits in computers or other electronic devices. There are many different types of memory, including volatile and non-volatile memory.

Volatile memory requires power to maintain its data, and includes random-access memory (RAM), dynamic random-access memory (DRAM), or synchronous dynamic random-access memory (SDRAM), among others.

Non-volatile memory can retain stored data when not powered, and includes flash memory, read-only memory (ROM), electrically erasable programmable ROM (EEPROM), static RAM (SRAM), erasable programmable ROM (EPROM), resistance variable memory, such as phase-change random-access memory (PCRAM), resistive random-access memory (RRAM), magnetoresistive random-access memory (MRAM), or 3D XPoint™ memory, among others.

Memory is typically described and organized by logical blocks that are virtual, and physical blocks. While physical blocks refer to (e.g., are addresses of) physical structures (e.g., locations) in the memory devices, logical blocks are conceptual analogues that provide flexible interfaces to the physical blocks. Thus, for example, if a memory device moves data from one physical block to another—for example to garbage collect the first physical block—a relationship from the first physical block to a corresponding logical block can be transferred without interrupting host operations that access the data via the logical block. The relationship between physical and logical blocks is generally maintained in a data structure, which may be referred to as a logical-to-physical (L2P) map (e.g., table, list, dictionary, or other data structure). As the physical structure of the memory device increases in size and complexity, often, so too does the L2P mapping.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

FIG. 2 illustrates an example representation of a page and corresponding spare areas.

FIG. 3 illustrates an example of pages potentially corrupted during a program fail.

DETAILED DESCRIPTION

Figure 1:
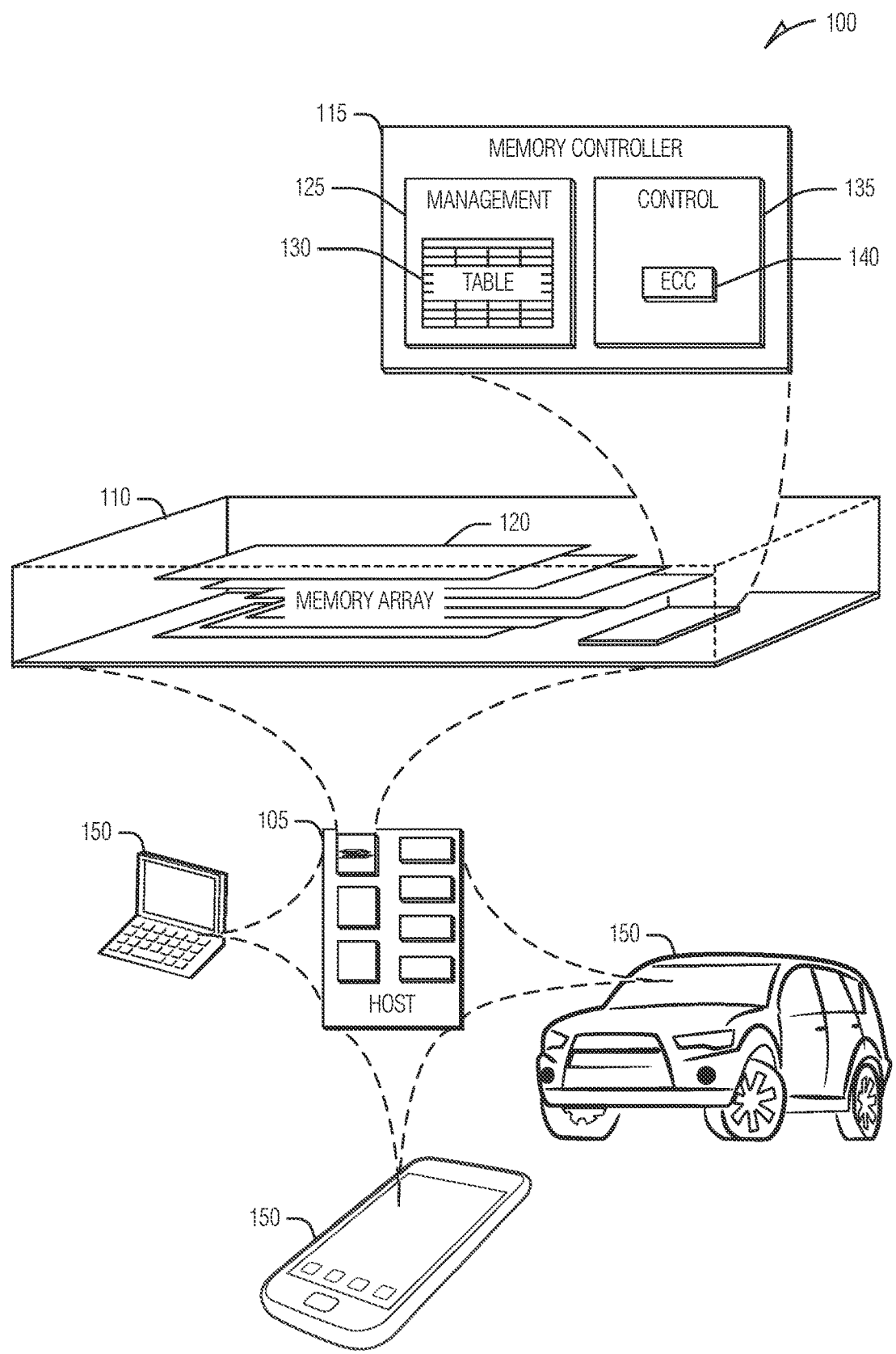
FIG. 1 illustrates an example of an environment including a memory device.

Various memory technologies, such as NAND or storage class memory (e.g., 3D XPoint™) perform maintenance operations, such as garbage collection. These maintenance operations often involve moving good data to a new location and reclaiming bad data (e.g., data marked as no longer current, erased by a host, etc.) via an erase operation or the like. Once bad data is reclaimed, the storage structure may generally be used to store new data. In a managed memory device, the memory device includes a controller to perform such maintenance operations, instead of, for example, a host performing these operations.

An issue that can arise in some memory devices, such as NAND devices, is possible corruption of data during a failure, such as a program (e.g., write) failure to a page, or asynchronous power loss to the device during a write, among other failures. A traditional technique to address such failures includes increase error correction code (ECC) levels (e.g., number of ECC bits) to pages; the ECC being relied upon to recover data after a failure. Although it is possible for increased ECC to provide a good level of data protection, the progressive shrink of memory geometries and increase to controller complexity has made implementing more sophisticated ECC protection difficult. This is exacerbated by the limited working memory (e.g., static random access memory (SRAM)) often included with managed memory controllers. In this environment, data redundancy generally results in expensive products that can suffer performance impacts, or simply waste storage space for data redundancy.

Writing data during garbage collection presents a failure scenario in which a data recovery technique can be used that is an alternative to provisioning additional storage area for data redundancy or sophisticated ECC schemes. In a garbage collection operation, as noted above, the data is moved from a first physical location (e.g., page) to a second physical location, and then the data in the first location is reclaimed. Because the reclamation generally occurs after the move, the unclaimed "old" data can operate as a redundant backup to the new data if data corruption occurs during the write of the data to the new location. When managing such data moves, however, a logical-to-physical (L2P) mapping is updated during the write. Thus, the old address of the data may be lost prior to the corruption. To address this issue, the old address of the data can be written to spare areas (e.g., extra bits) in a NAND page or the equivalent in other memory technologies.

The spare area used to store the old address is not of the same page as the data being written because a failure on the written data would likely also result in a failure of the spare area. Instead, the spare area of other pages is used. Several criteria can be placed on which pages store the previous address of other pages depending on performance or failure condition. Examples may include a constraint that the spare area used for a page is on a different pageline (e.g., wordline), on a different plane, or in a different die. Each of these locations can provide protection during an asynchronous power failure, a program failure, or a die failure respectively. In any case, the spare area uses a relationship to the written page in order to compute the spare area when possible corruption is identified for the page. In a failure condition, this spare area is accessed to retrieve the previous address for the page, the data is then re-read from the original physical location prior to reclamation and used to re-write the page.

Using the spare area to store previous physical addresses of the data provides several benefits in addition to the ready recovery of the data during a failure. For example, this solution does not impact the overprovisioning (e.g., dedicating additional storage resources to maintenance operations rather than for user data), and also does not impact memory device performance. Further, complexity for asynchronous power loss or program fail recovery is reduced in either the hardware or in the software (e.g., firmware) that runs thereon. Additional details and examples are provided below.

The following notes provide context to the discussion herein. Memory devices include individual memory die, which may, for example, include including a storage region comprising one or more arrays of memory cells, implementing one (or more) selected storage technologies. Such memory die will often include support circuitry for operating the memory array(s). Other examples, sometimes known generally as "managed memory devices," include assemblies of one or more memory die associated with controller functionality configured to control operation of the one or more memory die. Such controller functionality can simplify interoperability with an external device, as a "host" as discussed later herein. In such managed memory devices the controller functionality may be implemented on one or more die also incorporating a memory array, or on a separate die). In other examples, one or more memory devices may be combined with controller functionality to form a solid-stage drive (SSD) storage volume. The term "memory system," is used herein as inclusive of one or more memory die, and any controller functionality for such memory die, when present; and thus includes individual memory devices, managed memory devices, and SSDs.

Embodiments of the present disclosure are described in the example of managed memory devices implementing NAND flash memory cells, termed "managed NAND" devices. These examples, however, are not limiting on the scope of the disclosure, which may be implemented in other forms of memory devices and/or with other forms of storage technology.

Each flash memory cell in a NOR or NAND architecture semiconductor memory array can be programmed individually or collectively to one or a number of programmed states. For example, a single-level cell (SLC) can represent one of two programmed states (e.g., 1 or 0), representing one bit of data. Flash memory cells can also represent more than two programmed states, allowing the manufacture of higher density memories without increasing the number of memory cells, as each cell can represent more than one binary digit (e.g., more than one bit). Such cells can be referred to as multi-state memory cells, multi-digit cells, or multi-level cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and a quad-level cell (QLC) can store four bits of data per cell. MLC is used herein in its broader context, to refer to any memory cell(s) that can store more than one bit of data per cell (i.e., that can represent more than two programmed states).

Managed memory devices may be configured and operated in accordance with recognized industry standards. For example, managed NAND devices may be (as non-limiting examples), a Universal Flash Storage (UFS™) device, or an embedded MMC device (eMMC™), etc. For example, in the case of the above examples, UFS devices may be configured in accordance with Joint Electron Device Engineering Council (JEDEC) standards (e.g., JEDEC standard JESD223D, entitled JEDEC UFS Flash Storage 3.0, etc., and/or updates or subsequent versions to such standard. Similarly, identified eMMC devices may be configured in accordance with JEDEC standard JESD84-A51, entitled "JEDEC eMMC standard 5.1", again, and/or updates or subsequent versions to such standard. The identified standards are provided only as example environments in which the described methods and structures may be utilized. Such methods and structures may be utilized in a variety of environments outside of the identified standards (or of any other actual or proposed standards), except as expressly indicated herein.

An SSD can be used as, among other things, the main storage device of a computer, having advantages over traditional hard drives with moving parts with respect to, for example, performance, size, weight, ruggedness, operating temperature range, and power consumption. For example, SSDs can have reduced seek time, latency, or other delay associated with magnetic disk drives (e.g., electromechanical, etc.). SSDs use non-volatile memory cells, such as flash memory cells to obviate internal battery supply requirements, thus allowing the drive to be more versatile and compact. Managed memory devices, for example managed NAND devices, can be used as primary or ancillary memory in various forms of electronic devices, and are commonly used in mobile devices.

Both SSDs and managed memory devices can include a number of memory devices, including a number of dies or logical units (e.g., logical unit numbers or LUNs), and can include one or more processors or other controllers performing logic functions required to operate the memory devices or interface with external systems. Such SSDs and managed memory devices can include one or more flash memory die, including a number of memory arrays and peripheral circuitry thereon. The flash memory arrays can include a number of blocks of memory cells organized into a number of physical pages. In some examples, the SSDs can also include DRAM or SRAM (or other forms of memory die or other memory structures). Similarly, managed NAND devices can include one or more arrays of volatile and/or nonvolatile memory separate from the NAND storage array, and either within or separate from a controller. Both SSDs and managed NAND devices can receive commands from a host in association with memory operations, such as read or write operations to transfer data (e.g., user data and associated integrity data, such as error data and address data, etc.) between the memory devices and the host, or erase operations to erase data from the memory devices.

FIG. 1 illustrates an example of an environment 100 including a host device 105 and a memory device 110 configured to communicate over a communication interface. The host device 105 or the memory device 110 can be included in a variety of products 150, such as Internet of Things (IoT) devices (e.g., a refrigerator or other appliance, sensor, motor or actuator, mobile communication device, automobile, drone, etc.) to support processing, communications, or control of the product 150.

The memory device 110 includes a memory controller 115 and a memory array 120 including, for example, a number of individual memory die (e.g., a stack of three-dimensional (3D) NAND die). In 3D architecture semiconductor memory technology, vertical structures are stacked, increasing the number of tiers, physical pages, and accordingly, the density of a memory device (e.g., a storage device). In an example, the memory device 110 can be a discrete memory or storage device component of the host device 105. In other examples, the memory device 110 can be a portion of an integrated circuit (e.g., system on a chip (SOC), etc.), stacked or otherwise included with one or more other components of the host device 105.

One or more communication interfaces can be used to transfer data between the memory device 110 and one or more other components of the host device 105, such as a Serial Advanced Technology Attachment (SATA) interface, a Peripheral Component Interconnect Express (PCIe) interface, a Universal Serial Bus (USB) interface, a UFS interface, an eMMC™ interface, or one or more other connectors or interfaces. The host device 105 can include a host system, an electronic device, a processor, a memory card reader, or one or more other electronic devices external to the memory device 110. In some examples, the host 105 can be a machine having some portion, or all, of the components discussed in reference to the machine 1000 of FIG. 10.

The memory controller 115 can receive instructions from the host 105, and can communicate with the memory array 120, such as to transfer data to (e.g., write or erase) or from (e.g., read) one or more of the memory cells, planes, sub-blocks, blocks, or pages of the memory array 120. For example, the memory controller 115 can include one or more memory control units, circuits, or components configured to control access across the memory array 120 and to provide a translation layer between the host 105 and the memory device 110.

The memory controller 115 includes processing circuitry, which may include one or more processors which, when present, operate to execute instructions stored in the memory device, and may include additional circuitry or components. For purposes of the present examples, the instructions will be discussed as firmware, though instructions may also be present as software; and all or some portion of the described functions may also be implemented in circuitry including one or more components or integrated circuits. In some examples, the functions of memory controller 115 are implemented by a processor executing the instructions of firmware which in some examples would be stored within the memory controller 115. In other examples, one or more processors within memory controller 115, may execute instructions stored in the memory array 120. Similarly, the management tables 130 used by the controller can be stored on the memory controller 115 or in memory array 120. In such examples the instructions and/or management tables 130 may be stored in certain blocks of the NAND die of memory array 120 and loaded into the working memory of memory controller 115 during operation. The memory controller 115 can include, among other things, circuitry or firmware, including one or more components or integrated circuits.

The memory manager 125 can include, among other things, circuitry or firmware, such as several components or integrated circuits associated with various memory management functions. For purposes of the present description example memory operation and management functions will be described in the context of NAND memory. Persons skilled in the art will recognize that other forms of non-volatile memory can have analogous memory operations or management functions. Such NAND management functions include wear leveling (e.g., garbage collection or reclamation), error detection or correction, block retirement, or one or more other memory management functions. The memory manager 125 can parse or format host commands (e.g., commands received from a host) into device commands (e.g., commands associated with operation of a memory array, etc.), or generate device commands (e.g., to accomplish various memory management functions) for the array controller 135 or one or more other components of the memory device 110.

The memory manager 125 can include a set of management tables 130 configured to maintain various information associated with one or more component of the memory device 110 (e.g., various information associated with a memory array or one or more memory cells coupled to the memory controller 115). For example, the management tables 130 can include information regarding block age, block erase count, error history, or one or more error counts (e.g., a write operation error count, a read bit error count, a read operation error count, an erase error count, etc.) for one or more blocks of memory cells coupled to the memory controller 115. In certain examples, if the number of detected errors for one or more of the error counts is above a threshold, the bit error can be referred to as an uncorrectable bit error. The management tables 130 can maintain a count of correctable or uncorrectable bit errors, among other things. In an example, the management tables 103 can include translation tables or a L2P mapping.

The array controller 135 can include, among other things, circuitry or components configured to control memory operations associated with writing data to, reading data from, or erasing one or more memory cells of the memory device 110 coupled to the memory controller 115. The memory operations can be based on, for example, host commands received from the host 105, or internally generated by the memory manager 125 (e.g., in association with wear leveling, error detection or correction, etc.)

The array controller 135 can include an error correction code (ECC) component 140, which can include, among other things, an ECC engine or other circuitry configured to detect or correct errors associated with writing data to or reading data from one or more memory cells of the memory device 110 coupled to the memory controller 115. The memory controller 115 can be configured to actively detect and recover from error occurrences (e.g., bit errors, operation errors, etc.) associated with various operations or storage of data, while maintaining integrity of the data transferred between the host 105 and the memory device 110, or maintaining integrity of stored data (e.g., using redundant RAID storage, etc.), and can remove (e.g., retire) failing memory resources (e.g., memory cells, memory arrays, pages, blocks, etc.) to prevent future errors.

As noted above the memory controller 115 (e.g., through the memory manager 125, array controller 135, or other circuitry) is configured to handle both garbage collection and error correction. The memory controller 115 is also configured to implement corrupted storage portion recovery. Although the following discussion on corrupted storage portion recovery is from the perspective of the memory controller 115, in a non-managed memory device (e.g., where the controller is external to the memory device 110) the same techniques can be applied.

The memory controller 115 is configured to detect a failure event during a garbage collection operation on a collection of storage portions in the memory array 120. Here, members of the collection of storage portions are being moved from a former physical location to a new physical location by the garbage collection operation. In an example, moving the storage portion involves writing the data to the new physical location, updating an L2P mapping to correlate a logical identifier of the storage portion to the new physical location, and eventually erasing the former (e.g., previous, old, etc.) physical location. As noted herein, in a NAND device, the erasure is a block level erasure while the storage portion being moved can be as small as a page. Thus, the erasure is often delayed until the good data is completely written to new physical locations.

Figure 4:
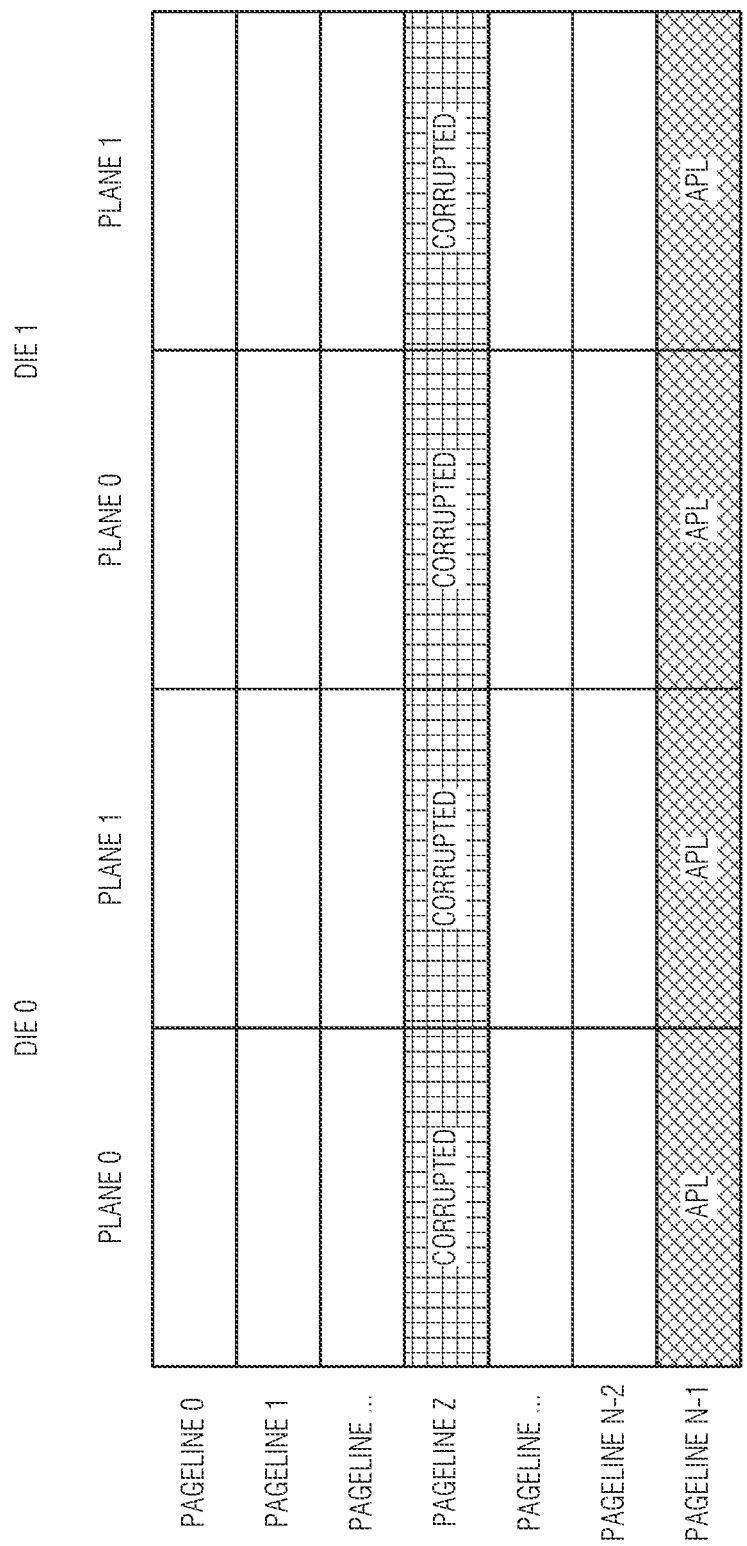
FIG. 4 illustrates an example of pages potentially corrupted during an asynchronous power failure during programming.

Detecting the failure event can include a sensor of the memory controller 115 directly observing the event or it can include a message generated from another device, such as the array controller 135 or other device involved with writing data to the memory array 120. In an example, the failure event is asynchronous power loss during a program of a member of the collection of storage portions. The impact of an asynchronous power loss while writing data to the new physical locations can be dependent upon the device geometry. Generally, an asynchronous power loss while writing a page line in a NAND device can corrupt another page line. FIG. 4 illustrates this relationship.

Figure 3:
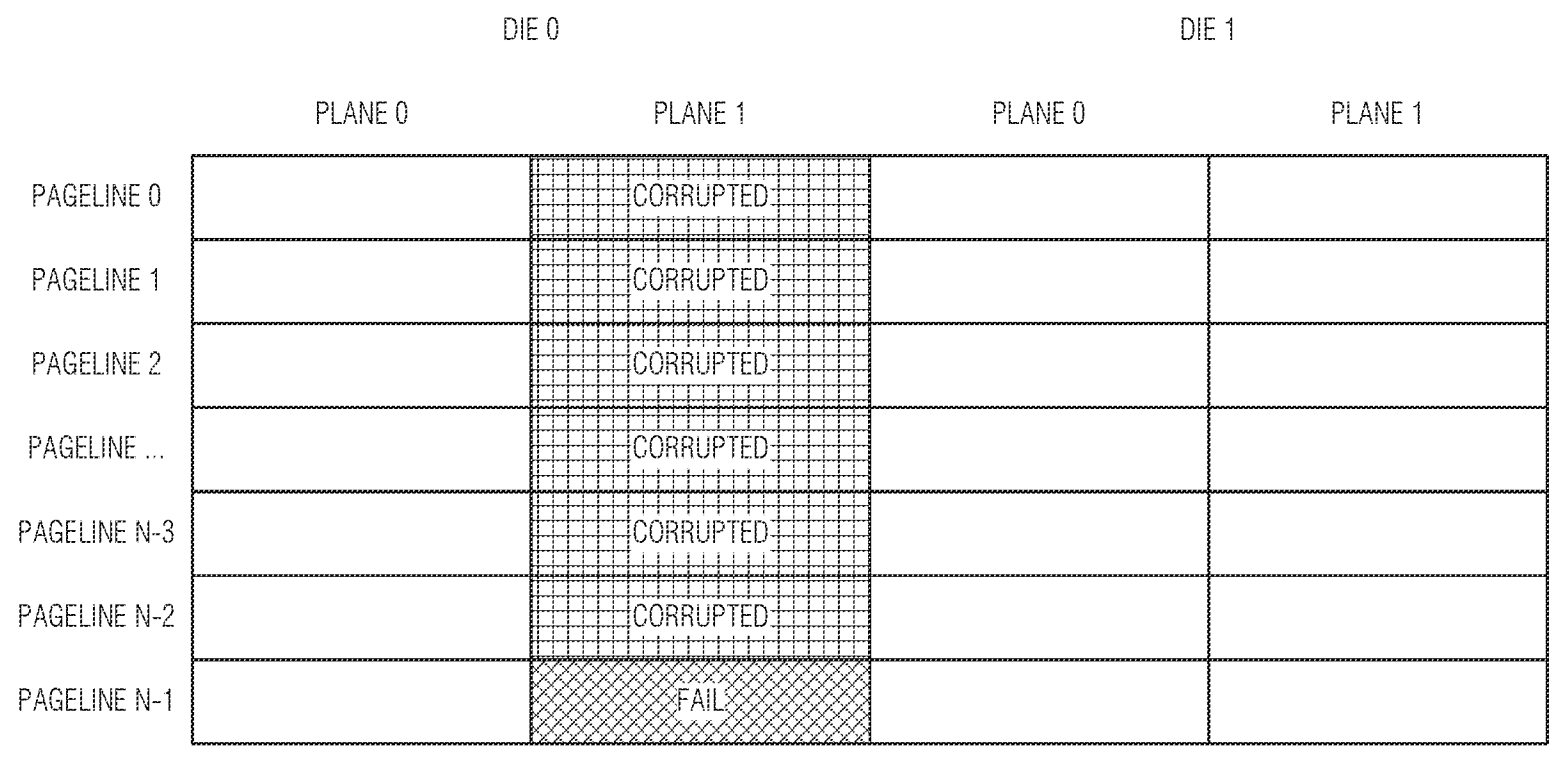

In an example, the failure event is a program fail of a member of the collection of storage portions. In a NAND device, such a failure can potentially corrupt already written pages in the same plane of the same die. FIG. 3 illustrates an example of this scenario. In an example, the failure event is a die failure. A die failure covers scenarios in which an entire NAND die becomes inaccessible (e.g., either reading or writing is no longer possible).

Once the failure event is detected, the memory controller 115 is configured to retrieve a reference to a former physical location of a possibly corrupt storage portion in the collection of storage portions. Here, the possibly corrupt storage portion has already been written to a new physical location. Thus, generally, the failure occurs while writing a different, later in the garbage collection process storage portion than the one that is potentially corrupted by the failure. The storage portion is possibly (e.g., potentially) corrupt because failures during programming can lead to corruption of previously written storage portions although it is not necessarily true that the storage portions are corrupted. This potential for corruption generally entails an error recovery process to address potential data loss. Because the garbage collection is not yet complete, an uncorrupted version of the data resides at the former physical address of the possible corrupt storage portion. Thus, as explained further below, no involved error correction, or even verification of an error existing, is needed. Rather, the known good data at the former physical location can be re-read and used to establish an uncorrupted version of the data at the new physical location, or a second new physical location (e.g., in a different die in the case of a die failure).

In an example, to retrieve the reference to the former physical location of the possibly corrupt storage portion, the memory controller 115 is configured to identify a second storage portion based on a physical relationship between the new physical location for the possibly corrupt storage portion and a new physical location of the second storage portion. The former physical location of the possibly corrupt storage portion is then read from the new physical location of the second storage portion. In these examples, a defined relationship between the possibly corrupt storage portion and the other storage location that houses the former physical address is used to avoid a map or other translation. Thus, the defined relationship is used to calculate the second storage location given the possibly corrupt storage portion. In an example, when the storage portions are NAND pages, the former physical address is stored in a spare area of the second page. Here, reading the former physical location of the possibly corrupt storage portion from the new physical location of the second storage portion includes reading the spare area of a NAND page that is the new physical location of the second storage portion. Thus, as the second storage portion is written, the former physical address of the first storage portion (the possibly corrupt storage portion) is written with the second storage portion. As these are all in the new physical locations, no mapping is needed back to the former physical storage portions.

In an example, the memory controller 115 is configured to identify the second storage portion based on the physical relationship between the new physical location for the possibly corrupt storage portion and the new physical location of the second storage portion during an original write of the possibly corrupt storage portion for the garbage collection operation. Here, the defined relationship is used to identify which physical portion's former physical address will be written when a physical portion is written to the new physical address. Thus, as part of the standard write to the new physical locations, the former physical locations will be written in accordance with the defined relationship. Accordingly, in the context of the a possibly corrupt storage location, the former physical location of the possibly corrupt storage portion is written in the new physical location of the second storage portion to be later retrieved as detailed above.

As noted above, the storage portion can be a NAND page. Also, in an example, the collection of storage portions can be a block in a NAND device. In an example, to identify the second storage portion based on the physical relationship between the new physical location for the possibly corrupt storage portion and the new physical location of the second storage portion—e.g., using the defined relationship to calculate the second physical portion from the possible corrupt physical portion—the memory controller 115 is configured to add an offset to a page line of the new physical address of the possibly corrupt storage portion. Thus, if the possibly corrupt page is on pageline z, then the second page is on z+1 or z−1 (z+(−1)). Such an offset ensures that the former physical address will be available if the entire pageline is possibly corrupt, such as during an asynchronous power loss event.

In an example, to identify a second storage portion based on the physical relationship between the new physical location for the possibly corrupt storage portion and the new physical location of the second storage portion—e.g., using the defined relationship to calculate the second physical portion from the possible corrupt physical portion—the memory controller 115 is configured to add an offset to a NAND die of the new physical address of the possibly corrupt storage portion. In an example, identifying a second storage portion based on the physical relationship between the new physical location for the possibly corrupt storage portion and the new physical location of the second storage portion includes using a same plane in the offset NAND die. Combining these offsets yields storage schemas for former physical address such as those illustrated in FIG. 5 and FIG. 6. These defined relationships ensure that the former physical address is available during possible corruption in a NAND plane, a NAND die, or a NAND pageline.

Once the former physical location of the possible corrupt storage portion is retrieved by the memory controller 115, the memory controller 115 is configured to read the data at the former physical location. This good, or uncorrupted, data is then rewritten at the new physical location. Rewriting the good data is an efficient technique to ensure that the data at the new physical location is uncorrupted whether or not is was actually corrupted by the failure event. In an example, the new physical location has changed to an operable memory array element. Thus, if the new physical location originally pointed to a NAND cell that was on a failed die, it is remapped to a cell in an operable die.

The corrupted storage portion recovery techniques described herein provide several benefits over current approaches. For example, these techniques do not rely on overprovisioning resources in the memory array 120 to store good copies of data. Rather, the presence of the good data at the former physical location prior to completion of the garbage collection is leveraged. Moreover, because extensive error correction is not used, performance of the memory device 110 is not affected while reducing the complexity of the memory device 110. Thus, a simpler, performant, and more robust to data corruption memory device 110 is achieved.

The memory array 120 can include several memory cells arranged in, for example, a number of devices, planes, sub-blocks, blocks, or pages. As one example, a 48 GB TLC NAND memory device can include 18,592 bytes (B) of data per page (16,384+2208 bytes), 1536 pages per block, 548 blocks per plane, and 4 or more planes per device. As another example, a 32 GB MLC memory device (storing two bits of data per cell (i.e., 4 programmable states)) can include 18,592 bytes (B) of data per page (16,384+2208 bytes), 1024 pages per block, 548 blocks per plane, and 4 planes per device, but with half the required write time and twice the program/erase (P/E) cycles as a corresponding TLC memory device. Other examples can include other numbers or arrangements. In some examples, a memory device, or a portion thereof, can be selectively operated in SLC mode, or in a desired MLC mode (such as TLC, CLC, etc.).

In operation, for example when the memory array is a NAND array, data is typically written to or read from the memory device 110 in pages and erased in blocks. However, one or more memory operations (e.g., read, write, erase, etc.) can be performed on larger or smaller groups of memory cells, as desired. The data transfer size of a memory device 110 is typically referred to as a page, whereas the data transfer size of a host is typically referred to as a sector.

Although a page of data can include a number of bytes of user data (e.g., a data payload including a number of sectors of data) and its corresponding metadata, the size of the page often refers only to the number of bytes used to store the user data. As an example, a page of data having a page size of 4 KB can include 4 KB of user data (e.g., 8 sectors assuming a sector size of 512 B) as well as a number of bytes (e.g., 32 B, 54 B, 224 B, etc.) of metadata corresponding to the user data, such as integrity data (e.g., error detecting or correcting code data), address data (e.g., logical address data, etc.), or other metadata associated with the user data.

Different types of memory cells or memory arrays 120 can provide for different page sizes, or can require different amounts of metadata associated therewith. For example, different memory device types can have different bit error rates, which can lead to different amounts of metadata necessary to ensure integrity of the page of data (e.g., a memory device with a higher bit error rate can require more bytes of error correction code data than a memory device with a lower bit error rate). As an example, a multi-level cell (MLC) NAND flash device can have a higher bit error rate than a corresponding single-level cell (SLC) NAND flash device. As such, the MLC device can require more metadata bytes for error data than the corresponding SLC device.

FIG. 2 illustrates an example representation of a page and corresponding spare areas, as can be implemented by the system 100 of FIG. 1. The example of FIG. 2 provides a NAND memory device context to corrupted storage portion recovery. Here is a memory arranged as pages in blocks in planes in die. Although a plane in a die generally includes several blocks, as illustrated, the pages in a plane are in a single block. Here, the pagelines are homologous pages belonging to planes (illustrated as rows). Note that the individual pages are illustrated as having two spare areas, though these can be a contiguous area that has space (e.g., bits) to represent two physical page addresses. The illustrated structure provides context for the discussion below with respect to FIGS. 3-8.

FIG. 3 illustrates an example of pages potentially corrupted during a program fail. Here, due to memory program (e.g., writing to a NAND cell) issue there is a programming failure of the diagonal cross-hatched page belonging to plane N−1. Such a failure can potentially corrupt many pages, illustrated with horizontal-and-vertical cross hatching in the same plane.

FIG. 4 illustrates an example of pages potentially corrupted during an asynchronous power failure during programming. Here, due to internal memory geometry, an asynchronous power loss event during program of any page in pageline N−1 (illustrated with diagonal cross hatching) can potentially corrupt pages in pageline Z (illustrated with horizontal-and-vertical cross hatching).

Figure 5:
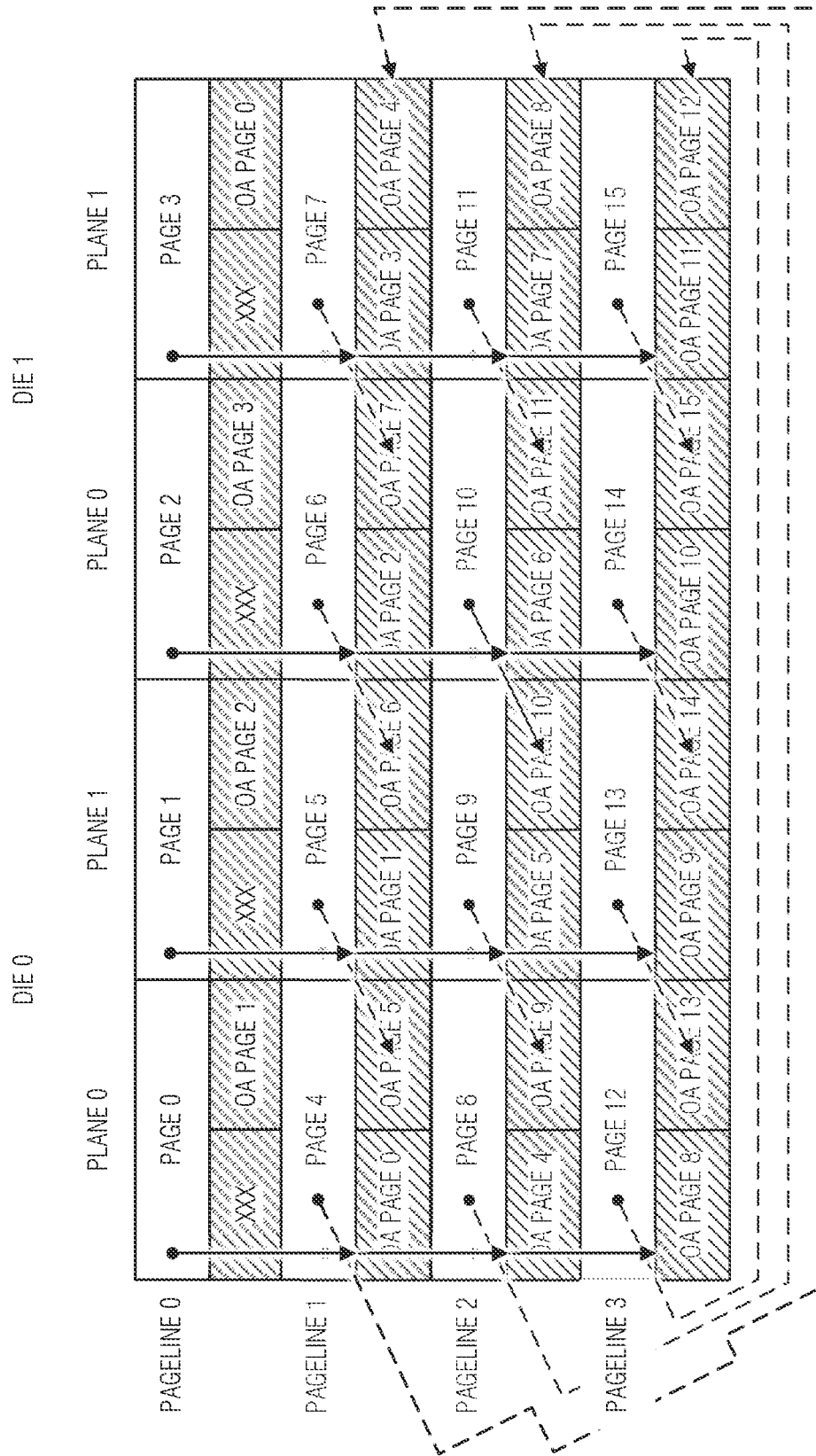
FIG. 5 illustrates an example storage structure for recovery addresses of pages.
Figure 6:
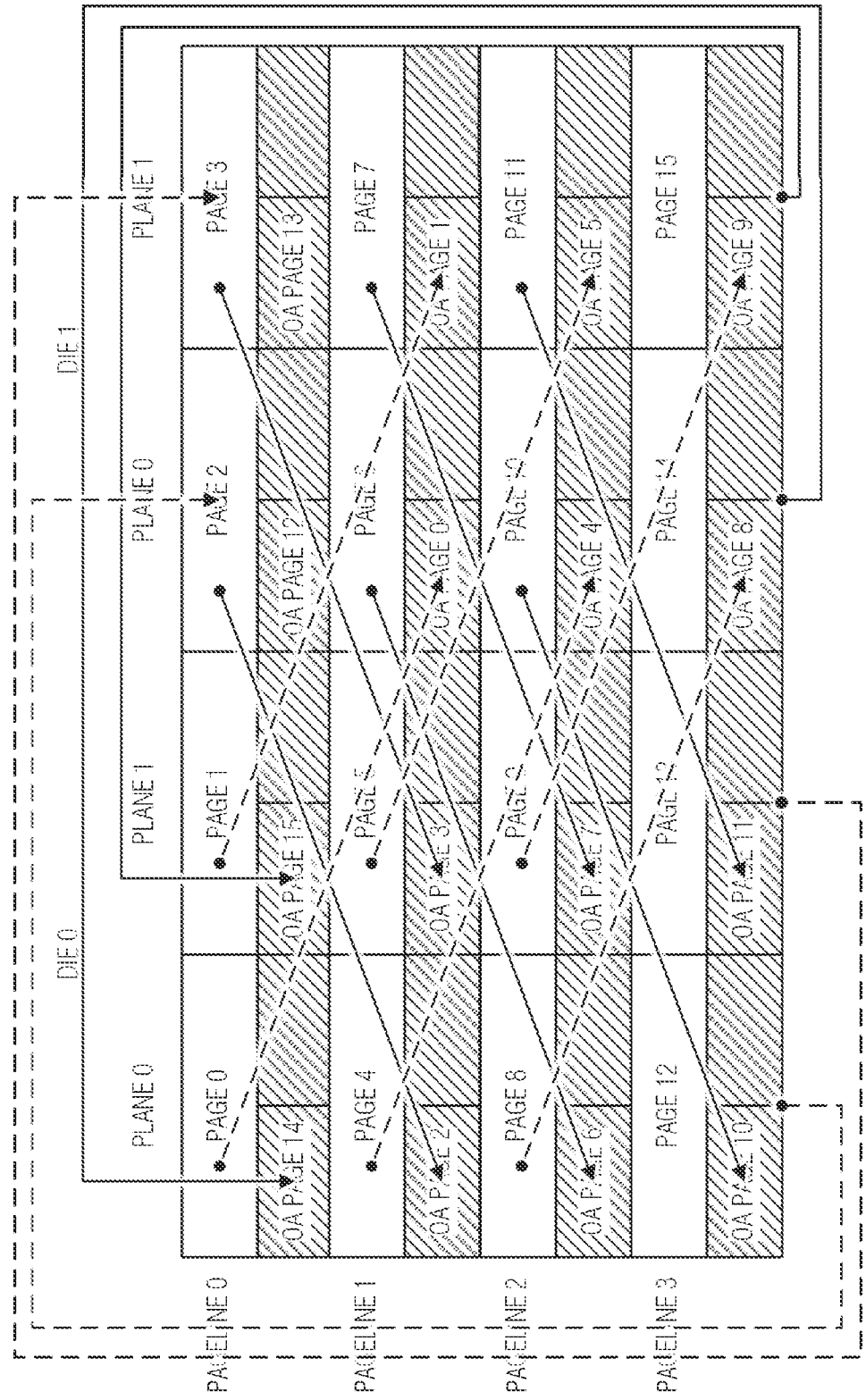
FIG. 6 illustrates an example storage structure for recovery addresses of pages.

FIG. 5 and FIG. 6 illustrate example schemas to store former physical addresses to perform the data recovery described herein. Again, the redundancy is achieved using data stored at the old addresses. These old addresses are saved in a spare area of other (e.g., neighbor) pages (e.g., virtual pages) inside a block.

FIG. 5 illustrates an example storage structure for recovery addresses of pages. The arrows indicate which spare area holds the address for a given page. The arrows are solid to indicate cross-pageline relationships and dashed for intra-pageline relationships. As illustrated, both spare areas of most pages in the blocks are used to store the former physical addresses. Taking page 5, for example, the spare areas provide the former address of page 1 and the former address of page 6. The first spare area provides pageline corruption protection (e.g., under an asynchronous power failure) and the second spare area provides plane corruption protection (e.g., under a program failure). Thus, for asynchronous power loss, address pointers to a previous pageline are used to retrieve the good data, and, for program failures, pointers on the same pageline are used to retrieve the good data from the former physical location of page 5.

FIG. 6 illustrates an example storage structure for recovery addresses of pages. The arrows are solid in one direction and dashed in another direction for clarity alone. The schema illustrated in FIG. 6 is an alternative to that of FIG. 5. Rather than a horizontal and vertical arrangement in the defined relationship as illustrated in FIG. 5, a diagonal physical relationship is illustrated. Thus, here, a neighboring page is a page on a previous pageline, in the same plane, and on a next die. Accordingly, page 5 stores the former address of page 3 because page 5 is in the next pageline (pageline 0+1=pageline 1), the same plane (plane 1), and the next die (die 1+1 modulus 2=die 0).

The schema illustrated in FIG. 6 provides some additional benefits over that of FIG. 5. For example, half the spare area is consumed in the schema of FIG. 6 because the spare area holds a single former physical address rather than two. Also, the schema of FIG. 6 protection in case of die failure because of the die offset in the define relationship.

This schema can provide an extension to ECC to provide protection against asynchronous power loss events on single or multi-level NAND blocks as wells as NAND program failure events that may corrupt more than one pageline. For example, in an asynchronous power loss event, reading the spare area of pages in pageline Z+1 provides former physical addresses to recover all pages of pageline Z. For a program failure, reading the spare area of pages of Die 0 Plane 1 it is possible recover former physical addresses for all pages of Die 1 Plane 1. Again, if entire die becomes inaccessible, reading the spare area of pages of Die 0 makes it possible to recover former physical addresses of all pages of Die 1. Accordingly, corrupted rows and corrupted columns are completely recoverable.

Figure 7:
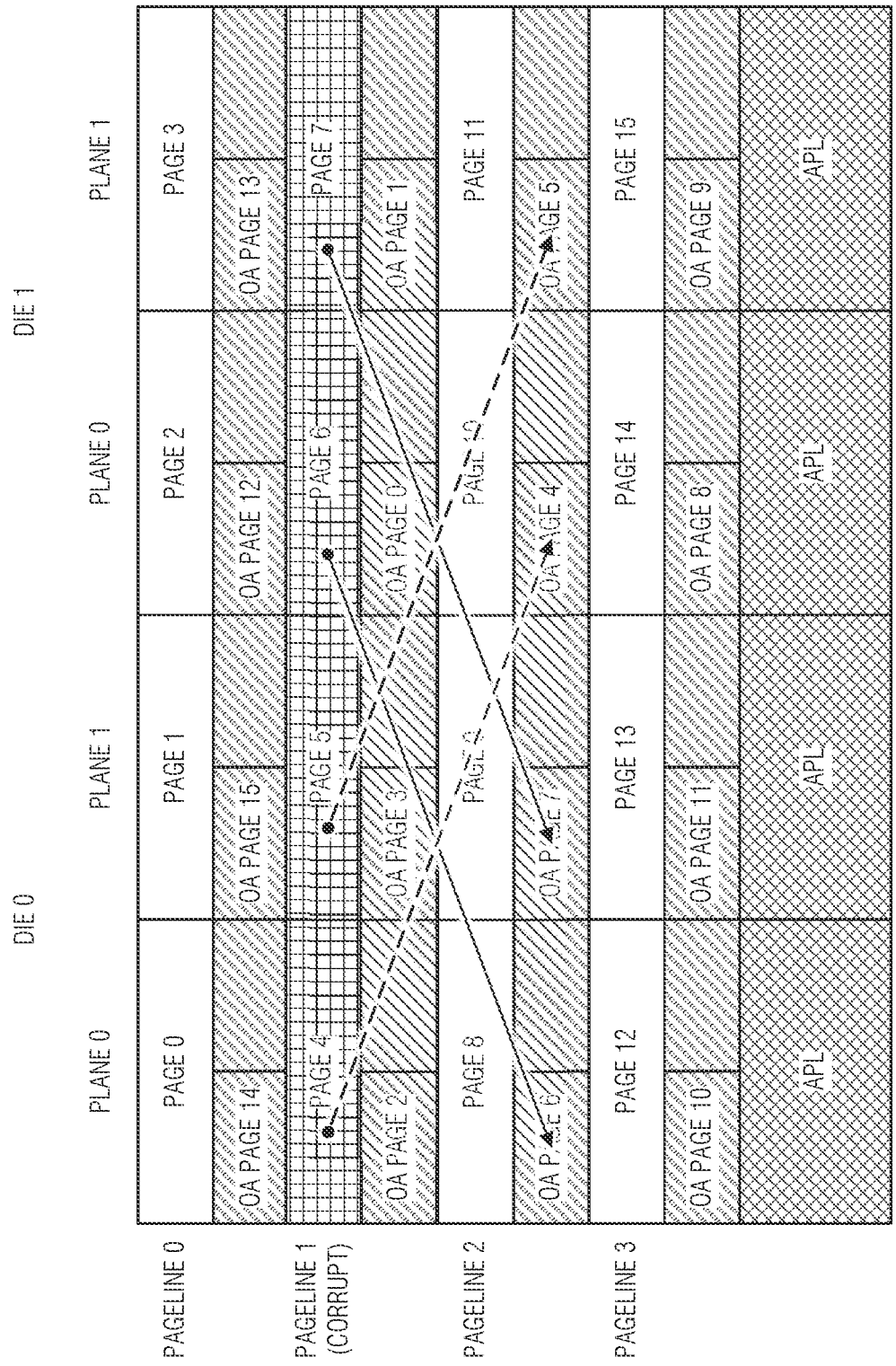
FIG. 7 illustrates an example of recovering data during an asynchronous power loss event using a storage structure for recovery addresses of pages.

FIG. 7 illustrates an example of recovering data during an asynchronous power loss event using a storage structure for recovery addresses of pages. Extending the discussion above with respect to FIG. 6, pageline 1 is corrupted in FIG. 7 by an asynchronous power loss event after the writing of pageline 3. Here, the reading the spare areas of pages in pageline 2 (pageline 1+1) yields the former physical addresses for pages in pageline 1. These former physical addresses are used to read the uncorrupted data and rewrite the pages in pageline 1.

Figure 8:
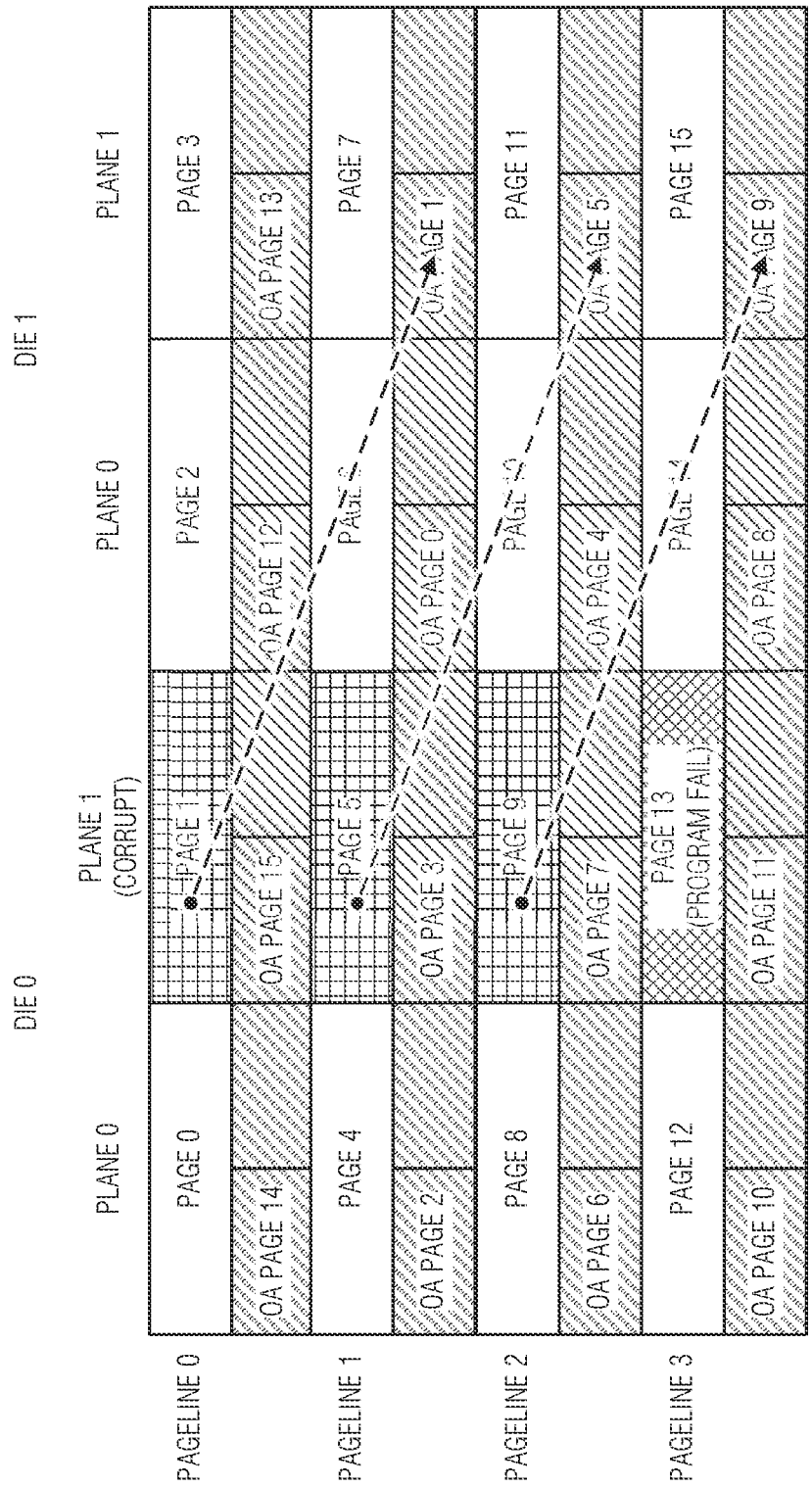
FIG. 8 illustrates an example of recovering data during a program failure event using a storage structure for recovery addresses of pages

FIG. 8 illustrates an example of recovering data during a program failure event using a storage structure for recovery addresses of pages. Here, the pages in plane 1 of Die 0 are possibly corrupt following a program failure of page 13. To recover the former addresses of these pages, the spare areas of the same plane in the adjacent die provides the former physical addresses of the possibly corrupt pages. Similarly, if the entire Die 0 is inaccessible, reading the spare areas of pages in Die 1 will yields the former physical addresses of the pages in Die 0.

Figure 9:
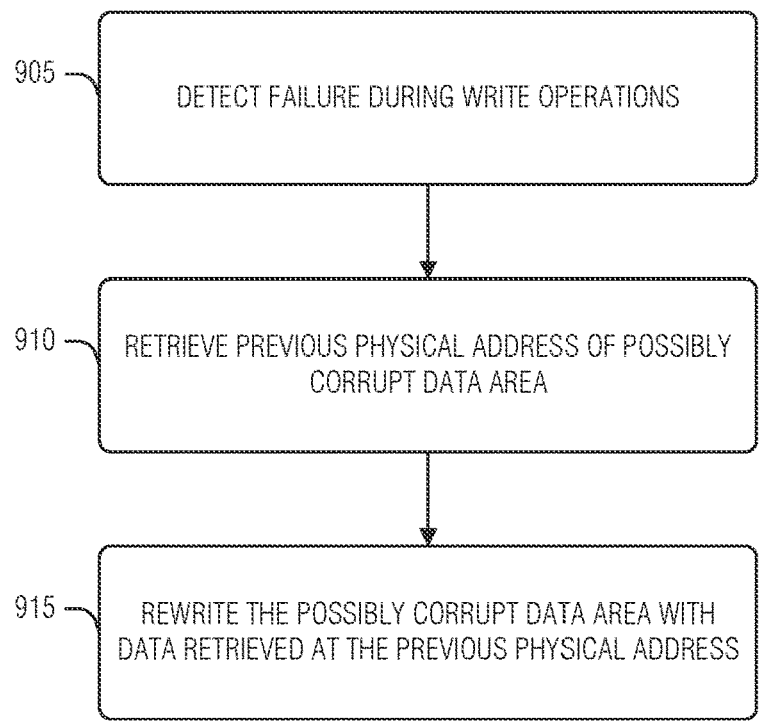
FIG. 9 illustrates a flowchart of an example of a method for corrupted storage portion recovery in a memory device.

FIG. 9 illustrates a flowchart of an example of a method 900 for corrupted storage portion recovery in a memory device. The operations of the method 900 are performed by computing hardware. An example of such computing hardware can include the memory controller 115 or other processing circuitry of the memory device 110 described above with respect to FIG. 1, other computer components, such as an external memory controller.

At operation 905, a failure event is detected during a garbage collection operation on a collection of storage portions in a memory array. Here, members of the collection of storage portions are being moved from a former physical location to a new physical location by the garbage collection operation. In an example, the failure event is asynchronous power loss during a program of a member of the collection of storage portions. In an example, the failure event is a program fail of a member of the collection of storage portions. In an example, the failure event is a die failure.

At operation 910, a reference to a former physical location of a possibly corrupt storage portion in the collection of storage portions is retrieved in response to the failure event. Here, the possibly corrupt storage portion has already been written to a new physical location. In an example, retrieving the reference to the former physical location of the possibly corrupt storage portion includes identifying a second storage portion based on a physical relationship between the new physical location for the possibly corrupt storage portion and a new physical location of the second storage portion. The former physical location of the possibly corrupt storage portion is then read from the new physical location of the second storage portion. In an example, reading the former physical location of the possibly corrupt storage portion from the new physical location of the second storage portion includes reading a spare area of a NAND page that is the new physical location of the second storage portion. In an example, the method 900 is extended to include identifying the second storage portion based on the physical relationship between the new physical location for the possibly corrupt storage portion and the new physical location of the second storage portion during an original write of the possibly corrupt storage portion for the garbage collection operation. The former physical location of the possibly corrupt storage portion is then written in the new physical location of the second storage portion.

In an example, the storage portion is a page. In an example, the collection of storage portions is a block in a NAND device. In an example, identifying the second storage portion based on the physical relationship between the new physical location for the possibly corrupt storage portion and the new physical location of the second storage portion includes adding an offset to a page line of the new physical address of the possibly corrupt storage portion. In an example, identifying a second storage portion based on the physical relationship between the new physical location for the possibly corrupt storage portion and the new physical location of the second storage portion includes adding an offset to a NAND die of the new physical address of the possibly corrupt storage portion. In an example, identifying a second storage portion based on the physical relationship between the new physical location for the possibly corrupt storage portion and the new physical location of the second storage portion includes using a same plane in the offset NAND die.

At operation 915, the possibly corrupt storage portion is rewritten at the new physical location using data from the former physical location. Thus, the data is efficiently recovered. Here, efficiency can be observed in several contexts. Using the old address of the possibly corrupted data in a spare area of the storage array results in small working memory use, does not consume storage resources (e.g., NAND cells set aside for this purpose), does not affect memory device performance, reduces hardware or software complexity, and increases memory device resiliency to failures.

Figure 10:
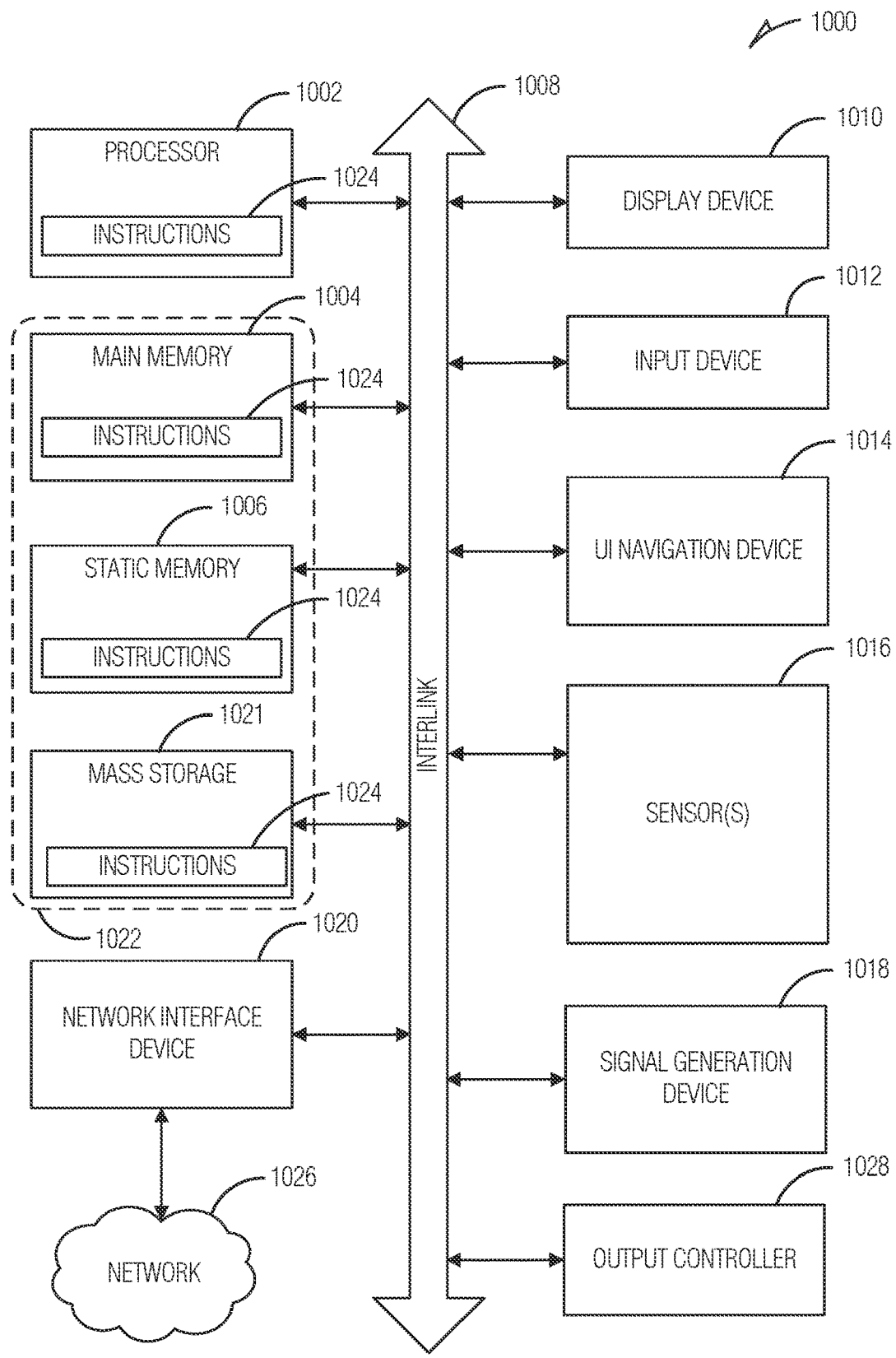
FIG. 10 is a block diagram illustrating an example of a machine upon which one or more embodiments can be implemented.

FIG. 10 illustrates a block diagram of an example machine 1000 upon which any one or more of the techniques (e.g., methodologies) discussed herein can perform. For example, any of the memory systems within machine 1100 (main memory 1104, static memory 1106, and mass storage 1121) may implement corrupted storage portion recovery relative to FIGS. 1-9 herein. In alternative embodiments, the machine 1000 can operate as a standalone device or can be connected (e.g., networked) to other machines. In a networked deployment, the machine 1000 can operate in the capacity of a server machine, a client machine, or both in server-client network environments. In an example, the machine 1000 can act as a peer machine in peer-to-peer (P2P) (or other distributed) network environment. The machine 1000 can be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, can include, or can operate by, logic, components, devices, packages, or mechanisms. Circuitry is a collection (e.g., set) of circuits implemented in tangible entities that include hardware (e.g., simple circuits, gates, logic, etc.). Circuitry membership can be flexible over time and underlying hardware variability. Circuitries include members that can, alone or in combination, perform specific tasks when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer readable medium is communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time.

The machine (e.g., computer system) 1000 (e.g., the host device 105, the memory device 110, etc.) can include a hardware processor 1002 (e.g., a central processing unit (CPU), a graphics processing unit (GPU), a hardware processor core, or any combination thereof, such as the memory controller 115, etc.), a main memory 1004 and a static memory 1006, some or all of which can communicate with each other via an interlink (e.g., bus) 1008. The machine 1000 can further include a display unit 1010, an alphanumeric input device 1012 (e.g., a keyboard), and a user interface (UI) navigation device 1014 (e.g., a mouse). In an example, the display unit 1010, input device 1012 and UI navigation device 1014 can be a touch screen display. The machine 1000 can additionally include a storage device (e.g., drive unit) 1021, a signal generation device 1018 (e.g., a speaker), a network interface device 1020, and one or more sensors 1016, such as a global positioning system (GPS) sensor, compass, accelerometer, or other sensor. The machine 1000 can include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1016 can include a machine readable medium 1022 on which is stored one or more sets of data structures or instructions 1024 (e.g., software) embodying or utilized by any one or more of the techniques or functions described herein. The instructions 1024 can also reside, completely or at least partially, within the main memory 1004, within static memory 1006, or within the hardware processor 1002 during execution thereof by the machine 1000. In an example, one or any combination of the hardware processor 1002, the main memory 1004, the static memory 1006, or the storage device 1016 can constitute the machine readable medium 1022.

While the machine readable medium 1022 is illustrated as a single medium, the term "machine readable medium" can include a single medium or multiple media (e.g., a centralized or distributed database, or associated caches and servers) configured to store the one or more instructions 1024.

The term "machine readable medium" can include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine readable medium examples can include solid-state memories, and optical and magnetic media. In an example, a massed machine readable medium comprises a machine-readable medium with a plurality of particles having invariant (e.g., rest) mass. Accordingly, massed machine-readable media are not transitory propagating signals. Specific examples of massed machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1024 (e.g., software, programs, an operating system (OS), etc.) or other data are stored on the storage device 1021, can be accessed by the memory 1004 for use by the processor 1002. The memory 1004 (e.g., DRAM) is typically fast, but volatile, and thus a different type of storage than the storage device 1021 (e.g., an SSD), which is suitable for long-term storage, including while in an "off" condition. The instructions 1024 or data in use by a user or the machine 1000 are typically loaded in the memory 1004 for use by the processor 1002. When the memory 1004 is full, virtual space from the storage device 1021 can be allocated to supplement the memory 1004; however, because the storage 1021 device is typically slower than the memory 1004, and write speeds are typically at least twice as slow as read speeds, use of virtual memory can greatly reduce user experience due to storage device latency (in contrast to the memory 1004, e.g., DRAM). Further, use of the storage device 1021 for virtual memory can greatly reduce the usable lifespan of the storage device 1021.

In contrast to virtual memory, virtual memory compression (e.g., the Linux® kernel feature "ZRAM") uses part of the memory as compressed block storage to avoid paging to the storage device 1021. Paging takes place in the compressed block until it is necessary to write such data to the storage device 1021. Virtual memory compression increases the usable size of memory 1004, while reducing wear on the storage device 1021.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host device, and are often removable and separate components from the host device. In contrast, eMMC™ devices are attached to a circuit board and considered a component of the host device, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing networks speeds, etc. In response to this demand, storage devices have shifted from parallel to serial communication interfaces. Universal Flash Storage (UFS) devices, including controllers and firmware, communicate with a host device using a low-voltage differential signaling (LVDS) serial interface with dedicated read/write paths, further advancing greater read/write speeds.

The instructions 1024 can further be transmitted or received over a communications network 1026 using a transmission medium via the network interface device 1020 utilizing any one of a number of transfer protocols (e.g., frame relay, internee protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1020 can include one or more physical jacks (e.g., Ethernet, coaxial, or phone jacks) or one or more antennas to connect to the communications network 1026. In an example, the network interface device 1020 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1000, and includes digital or analog communications signals or other intangible medium to facilitate communication of such software.

ADDITIONAL EXAMPLES

Example 1 is a memory controller for corrupted storage portion recovery in a memory device, the memory controller comprising: storage including instructions; and processing circuitry that, when in operation, is configured by the instructions to: detect a failure event during a garbage collection operation on a collection of storage portions in a memory array, members of the collection of storage portions being moved from a former physical location to a new physical location by the garbage collection operation; retrieve a reference to a former physical location of a possibly corrupt storage portion in the collection of storage portions in response to the failure event, the possibly corrupt storage portion having already been written to a new physical location; and rewrite the possibly corrupt storage portion at the new physical location using data from the former physical location.

In Example 2, the subject matter of Example 1, wherein, to retrieve the reference to the former physical location of the possibly corrupt storage portion, the processing circuitry is configured by the instructions to: identify a second storage portion based on a physical relationship between the new physical location for the possibly corrupt storage portion and a new physical location of the second storage portion; and read the former physical location of the possibly corrupt storage portion from the new physical location of the second storage portion.

In Example 3, the subject matter of Example 2, wherein the processing circuitry is configured by the instructions to: identify the second storage portion based on the physical relationship between the new physical location for the possibly corrupt storage portion and the new physical location of the second storage portion during an original write of the possibly corrupt storage portion for the garbage collection operation; and write the former physical location of the possibly corrupt storage portion in the new physical location of the second storage portion.

In Example 4, the subject matter of any of Examples 2-3, wherein the storage portion is a page, and wherein the collection of storage portions is a block in a NAND device.

In Example 5, the subject matter of Example 4, wherein, to identify the second storage portion based on the physical relationship between the new physical location for the possibly corrupt storage portion and the new physical location of the second storage portion, the processing circuitry is configured by the instructions to add an offset to a page line of the new physical address of the possibly corrupt storage portion.

In Example 6, the subject matter of any of Examples 4-5, wherein, to identify the second storage portion based on the physical relationship between the new physical location for the possibly corrupt storage portion and the new physical location of the second storage portion, the processing circuitry is configured by the instructions to add an offset to a NAND die of the new physical address of the possibly corrupt storage portion.

In Example 7, the subject matter of Example 6, wherein, to identify a second storage portion based on the physical relationship between the new physical location for the possibly corrupt storage portion and the new physical location of the second storage portion, the processing circuitry is configured by the instructions to use a same plane in the offset NAND die.

In Example 8, the subject matter of any of Examples 4-7, wherein, to read the former physical location of the possibly corrupt storage portion from the new physical location of the second storage portion, the processing circuitry is configured by the instructions to read a spare area of a NAND page that is the new physical location of the second storage portion.

In Example 9, the subject matter of any of Examples 1-8, wherein the failure event is asynchronous power loss during a program of a member of the collection of storage portions.

In Example 10, the subject matter of any of Examples 1-9, wherein the failure event is a program fail of a member of the collection of storage portions.

Example 11 is a method for corrupted storage portion recovery in a memory device, the method comprising: detecting a failure event during a garbage collection operation on a collection of storage portions in a memory array, members of the collection of storage portions being moved from a former physical location to a new physical location by the garbage collection operation; retrieving a reference to a former physical location of a possibly corrupt storage portion in the collection of storage portions in response to the failure event, the possibly corrupt storage portion having already been written to a new physical location; and rewriting the possibly corrupt storage portion at the new physical location using data from the former physical location.

In Example 12, the subject matter of Example 11, wherein retrieving the reference to the former physical location of the possibly corrupt storage portion includes: identifying a second storage portion based on a physical relationship between the new physical location for the possibly corrupt storage portion and a new physical location of the second storage portion; and reading the former physical location of the possibly corrupt storage portion from the new physical location of the second storage portion.

In Example 13, the subject matter of Example 12, comprising: identifying the second storage portion based on the physical relationship between the new physical location for the possibly corrupt storage portion and the new physical location of the second storage portion during an original write of the possibly corrupt storage portion for the garbage collection operation; and writing the former physical location of the possibly corrupt storage portion in the new physical location of the second storage portion.

In Example 14, the subject matter of any of Examples 12-13, wherein the storage portion is a page, and wherein the collection of storage portions is a block in a NAND device.

In Example 15, the subject matter of Example 14, wherein identifying the second storage portion based on the physical relationship between the new physical location for the possibly corrupt storage portion and the new physical location of the second storage portion includes adding an offset to a page line of the new physical address of the possibly corrupt storage portion.

In Example 16, the subject matter of any of Examples 14-15, wherein identifying the second storage portion based on the physical relationship between the new physical location for the possibly corrupt storage portion and the new physical location of the second storage portion includes adding an offset to a NAND die of the new physical address of the possibly corrupt storage portion.

In Example 17, the subject matter of Example 16, wherein identifying a second storage portion based on the physical relationship between the new physical location for the possibly corrupt storage portion and the new physical location of the second storage portion includes using a same plane in the offset NAND die.

In Example 18, the subject matter of any of Examples 14-17, wherein reading the former physical location of the possibly corrupt storage portion from the new physical location of the second storage portion includes reading a spare area of a NAND page that is the new physical location of the second storage portion.

In Example 19, the subject matter of any of Examples 11-48, wherein the failure event is asynchronous power loss during a program of a member of the collection of storage portions.

In Example 20, the subject matter of any of Examples 11-19, wherein the failure event is a program fail of a member of the collection of storage portions.

Example 21 is a machine-readable medium including instructions for corrupted storage portion recovery in a memory device, the instructions, when executed by processing circuitry, cause the processing circuitry to perform operations comprising: detecting a failure event during a garbage collection operation on a collection of storage portions in a memory array, members of the collection of storage portions being moved from a former physical location to a new physical location by the garbage collection operation; retrieving a reference to a former physical location of a possibly corrupt storage portion in the collection of storage portions in response to the failure event, the possibly corrupt storage portion having already been written to a new physical location; and rewriting the possibly corrupt storage portion at the new physical location using data from the former physical location.

In Example 22, the subject matter of Example 21, wherein retrieving the reference to the former physical location of the possibly corrupt storage portion includes: identifying a second storage portion based on a physical relationship between the new physical location for the possibly corrupt storage portion and a new physical location of the second storage portion; and reading the former physical location of the possibly corrupt storage portion from the new physical location of the second storage portion.

In Example 23, the subject matter of Example 22, wherein the operations comprise: identifying the second storage portion based on the physical relationship between the new physical location for the possibly corrupt storage portion and the new physical location of the second storage portion during an original write of the possibly corrupt storage portion for the garbage collection operation; and writing the former physical location of the possibly corrupt storage portion in the new physical location of the second storage portion.

In Example 24, the subject matter of any of Examples 22-23, wherein the storage portion is a page, and wherein the collection of storage portions is a block in a NAND device.

In Example 25, the subject matter of Example 24, wherein identifying the second storage portion based on the physical relationship between the new physical location for the possibly corrupt storage portion and the new physical location of the second storage portion includes adding an offset to a page line of the new physical address of the possibly corrupt storage portion.

In Example 26, the subject matter of any of Examples 24-25, wherein identifying the second storage portion based on the physical relationship between the new physical location for the possibly corrupt storage portion and the new physical location of the second storage portion includes adding an offset to a NAND die of the new physical address of the possibly corrupt storage portion.

In Example 27, the subject matter of Example 26, wherein identifying a second storage portion based on the physical relationship between the new physical location for the possibly corrupt storage portion and the new physical location of the second storage portion includes using a same plane in the offset NAND die.

In Example 28, the subject matter of any of Examples 24-27, wherein reading the former physical location of the possibly corrupt storage portion from the new physical location of the second storage portion includes reading a spare area of a NAND page that is the new physical location of the second storage portion.

In Example 29, the subject matter of any of Examples 21-28, wherein the failure event is asynchronous power loss during a program of a member of the collection of storage portions.

In Example 30, the subject matter of any of Examples 21-29, wherein the failure event is a program fail of a member of the collection of storage portions.

Example 31 is a system for corrupted storage portion recovery in a memory device, the system comprising: means for detecting a failure event during a garbage collection operation on a collection of storage portions in a memory array, members of the collection of storage portions being moved from a former physical location to a new physical location by the garbage collection operation; means for retrieving a reference to a former physical location of a possibly corrupt storage portion in the collection of storage portions in response to the failure event, the possibly corrupt storage portion having already been written to a new physical location; and means for rewriting the possibly corrupt storage portion at the new physical location using data from the former physical location.

In Example 32, the subject matter of Example 31, wherein the means for retrieving the reference to the former physical location of the possibly corrupt storage portion include: means for identifying a second storage portion based on a physical relationship between the new physical location for the possibly corrupt storage portion and a new physical location of the second storage portion; and means for reading the former physical location of the possibly corrupt storage portion from the new physical location of the second storage portion.

In Example 33, the subject matter of Example 32, comprising: means for identifying the second storage portion based on the physical relationship between the new physical location for the possibly corrupt storage portion and the new physical location of the second storage portion during an original write of the possibly corrupt storage portion for the garbage collection operation; and means for writing the former physical location of the possibly corrupt storage portion in the new physical location of the second storage portion.

In Example 34, the subject matter of any of Examples 32-33, wherein the storage portion is a page, and wherein the collection of storage portions is a block in a NAND device.

In Example 35, the subject matter of Example 34, wherein the means for identifying the second storage portion based on the physical relationship between the new physical location for the possibly corrupt storage portion and the new physical location of the second storage portion include means for adding an offset to a page line of the new physical address of the possibly corrupt storage portion.

In Example 36, the subject matter of any of Examples 34-35, wherein the means for identifying the second storage portion based on the physical relationship between the new physical location for the possibly corrupt storage portion and the new physical location of the second storage portion include means for adding an offset to a NAND die of the new physical address of the possibly corrupt storage portion.

In Example 37, the subject matter of Example 36, wherein the means for identifying a second storage portion based on the physical relationship between the new physical location for the possibly corrupt storage portion and the new physical location of the second storage portion include means for using a same plane in the offset NAND die.

In Example 38, the subject matter of any of Examples 34-37, wherein the means for reading the former physical location of the possibly corrupt storage portion from the new physical location of the second storage portion include means for reading a spare area of a NAND page that is the new physical location of the second storage portion.

In Example 39, the subject matter of any of Examples 31-38, wherein the failure event is asynchronous power loss during a program of a member of the collection of storage portions.

In Example 40, the subject matter of any of Examples 31-39, wherein the failure event is a program fail of a member of the collection of storage portions.

Example 41 is at least one machine-readable medium including instructions that, when executed by processing circuitry, cause the processing circuitry to perform operations to implement of any of Examples 1-40.

Example 42 is an apparatus comprising means to implement of any of Examples 1-40.

Example 43 is a system to implement of any of Examples 1-40.

Example 44 is a method to implement of any of Examples 1-40.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

The term "horizontal" as used in this document is defined as a plane parallel to the conventional plane or surface of a substrate, such as that underlying a wafer or die, regardless of the actual orientation of the substrate at any point in time. The term "vertical" refers to a direction perpendicular to the horizontal as defined above. Prepositions, such as "on,"

"over," and "under" are defined with respect to the conventional plane or surface being on the top or exposed surface of the substrate, regardless of the orientation of the substrate; and while "on" is intended to suggest a direct contact of one structure relative to another structure which it lies "on" (in the absence of an express indication to the contrary); the terms "over" and "under" are expressly intended to identify a relative placement of structures (or layers, features, etc.), which expressly includes—but is not limited to—direct contact between the identified structures unless specifically identified as such. Similarly, the terms "over" and "under" are not limited to horizontal orientations, as a structure can be "over" a referenced structure if it is, at some point in time, an outermost portion of the construction under discussion, even if such structure extends vertically relative to the referenced structure, rather than in a horizontal orientation.

The terms "wafer" and "substrate" are used herein to refer generally to any structure on which integrated circuits are formed, and also to such structures during various stages of integrated circuit fabrication. The following detailed description is, therefore, not to be taken in a limiting sense, and the scope of the various embodiments is defined only by the appended claims, along with the full scope of equivalents to which such claims are entitled.

Various embodiments according to the present disclosure and described herein include memory utilizing a vertical structure of memory cells (e.g., NAND strings of memory cells). As used herein, directional adjectives will be taken relative a surface of a substrate upon which the memory cells are formed (i.e., a vertical structure will be taken as extending away from the substrate surface, a bottom end of the vertical structure will be taken as the end nearest the substrate surface and a top end of the vertical structure will be taken as the end farthest from the substrate surface).

As used herein, directional adjectives, such as horizontal, vertical, normal, parallel, perpendicular, etc., can refer to relative orientations, and are not intended to require strict adherence to specific geometric properties, unless otherwise noted. For example, as used herein, a vertical structure need not be strictly perpendicular to a surface of a substrate, but can instead be generally perpendicular to the surface of the substrate, and can form an acute angle with the surface of the substrate (e.g., between 60 and 120 degrees, etc.).

In some embodiments described herein, different doping configurations can be applied to a source-side select gate (SGS), a control gate (CG), and a drain-side select gate (SGD), each of which, in this example, can be formed of or at least include polysilicon, with the result such that these tiers (e.g., polysilicon, etc.) can have different etch rates when exposed to an etching solution. For example, in a process of forming a monolithic pillar in a 3D semiconductor device, the SGS and the CG can form recesses, while the SGD can remain less recessed or even not recessed. These doping configurations can thus enable selective etching into the distinct tiers (e.g., SGS, CG, and SGD) in the 3D semiconductor device by using an etching solution (e.g., tetramethylammonium hydroxide (TMCH)).

Operating a memory cell, as used herein, includes reading from, writing to, or erasing the memory cell. The operation of placing a memory cell in an intended state is referred to herein as "programming," and can include both writing to or erasing from the memory cell (e.g., the memory cell can be programmed to an erased state).

According to one or more embodiments of the present disclosure, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.)

According to one or more embodiments of the present disclosure, a memory access device can be configured to provide wear cycle information to the memory device with each memory operation. The memory device control circuitry (e.g., control logic) can be programmed to compensate for memory device performance changes corresponding to the wear cycle information. The memory device can receive the wear cycle information and determine one or more operating parameters (e.g., a value, characteristic) in response to the wear cycle information.

It will be understood that when an element is referred to as being "connected to" or "coupled with" another element, it can be directly on, connected, or coupled with the other element or intervening elements can be present. In contrast, when an element is referred to as being "directly on," "directly connected to" or "directly coupled with" another element, there are no intervening elements or layers present. If two elements are shown in the drawings with a line connecting them, the two elements can be either be coupled, or directly coupled, unless otherwise indicated.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code can form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, random access memories (RAMs), read only memories (ROMs), solid state drives (SSDs), Universal Flash Storage (UFS) device, embedded MMC (eMMC) device, and the like.

The above description is intended to be illustrative, and not restrictive. For example, the above-described examples (or one or more aspects thereof) can be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A memory controller for corrupted storage portion recovery in a memory device, the memory controller comprising:
storage including instructions; and
processing circuitry that, when in operation, is configured by the instructions to:
detect a failure event during a garbage collection operation on a collection of storage portions in a memory array, members of the collection of storage portions being moved from a former physical location to a new physical location by the garbage collection operation, the members of the collection of storage portions including user data that was transferred from a host to the memory controller to be stored in the memory array, wherein the collection of storage portions is a block in a NAND device, and wherein a member of the collection of storage portions is a page;
retrieve a reference to a former physical location of a possibly corrupt storage portion in the collection of storage portions in response to the failure event, the possibly corrupt storage portion including user data, the possibly corrupt storage portion having already been written to a new physical location, an entry for the possibly corrupt storage portion, in a logical-to-physical (L2P) mapping table, having been updated to map to the new physical location when the possibly corrupt storage portion was written to the new physical location, the reference to the former physical location being outside the L2P mapping table, wherein, to retrieve the reference to the former physical location of the possibly corrupt storage portion, the processing circuitry is configured by the instructions to:
identify a second storage portion based on a physical relationship between the new physical location for the possibly corrupt storage portion and a new physical location of the second storage portion; and
read the former physical location of the possibly corrupt storage portion from the new physical location of the second storage portion; and
rewrite the possibly corrupt storage portion at the new physical location using the user data from the former physical location to restore the user data in the possibly corrupt storage portion.

2. The memory controller of claim 1, wherein the processing circuitry is configured by the instructions to:
identify the second storage portion based on the physical relationship between the new physical location for the possibly corrupt storage portion and the new physical location of the second storage portion during an original write of the possibly corrupt storage portion for the garbage collection operation; and
write the former physical location of the possibly corrupt storage portion in the new physical location of the second storage portion.

3. The memory controller of claim 1, wherein, to identify the second storage portion based on the physical relationship between the new physical location for the possibly corrupt storage portion and the new physical location of the second storage portion, the processing circuitry is configured by the instructions to add an offset to a page line of an address of the new physical location of the possibly corrupt storage portion.

4. The memory controller of claim 1, wherein, to identify the second storage portion based on the physical relationship between the new physical location for the possibly corrupt storage portion and the new physical location of the second storage portion, the processing circuitry is configured by the instructions to add an offset to a NAND die of an address of the new physical location of the possibly corrupt storage portion.

5. The memory controller of claim 4, wherein, to identify a second storage portion based on the physical relationship between the new physical location for the possibly corrupt storage portion and the new physical location of the second storage portion, the processing circuitry is configured by the instructions to use a same plane in the offset to the NAND die.

6. The memory controller of claim 1, wherein, to read the former physical location of the possibly corrupt storage portion from the new physical location of the second storage portion, the processing circuitry is configured by the instructions to read a spare area of a NAND page that is the new physical location of the second storage portion.

7. A method for corrupted storage portion recovery in a memory device, the method comprising:
detecting a failure event during a garbage collection operation on a collection of storage portions in a memory array, members of the collection of storage portions being moved from a former physical location to a new physical location by the garbage collection operation, the members of the collection of storage portions including user data that was transferred from a host to the memory device to be stored in the memory array, wherein the collection of storage portions is a block in a NAND device, and wherein a member of the collection of storage portions is a page;
retrieving a reference to a former physical location of a possibly corrupt storage portion in the collection of storage portions in response to the failure event, the possibly corrupt storage portion including user data, the possibly corrupt storage portion having already been written to a new physical location, an entry for the possibly corrupt storage portion, in a logical-to-physical (L2P) mapping table, having been updated to map to the new physical location when the possibly corrupt storage portion was written to the new physical location, the reference to the former physical location being outside the L2P mapping table, wherein retrieving the reference to the former physical location of the possibly corrupt storage portion includes:
identifying a second storage portion based on a physical relationship between the new physical location for the possibly corrupt storage portion and a new physical location of the second storage portion; and
reading the former physical location of the possibly corrupt storage portion from the new physical location of the second storage portion; and
rewriting the possibly corrupt storage portion at the new physical location using the user data from the former physical location to restore the user data in the possibly corrupt storage portion.

8. The method of claim 7, comprising:
identifying the second storage portion based on the physical relationship between the new physical location for the possibly corrupt storage portion and the new physical location of the second storage portion during an original write of the possibly corrupt storage portion for the garbage collection operation; and writing the former physical location of the possibly corrupt storage portion in the new physical location of the second storage portion.

9. The method of claim 7, wherein identifying the second storage portion based on the physical relationship between the new physical location for the possibly corrupt storage portion and the new physical location of the second storage portion includes adding an offset to a page line of an address of the new physical location of the possibly corrupt storage portion.

10. The method of claim 7, wherein identifying the second storage portion based on the physical relationship between the new physical location for the possibly corrupt storage portion and the new physical location of the second storage portion includes adding an offset to a NAND die of an address of the new physical location of the possibly corrupt storage portion.

11. The method of claim 10, wherein identifying a second storage portion based on the physical relationship between the new physical location for the possibly corrupt storage portion and the new physical location of the second storage portion includes using a same plane in the offset to the NAND die.

12. The method of claim 7, wherein reading the former physical location of the possibly corrupt storage portion from the new physical location of the second storage portion includes reading a spare area of a NAND page that is the new physical location of the second storage portion.

13. A non-transitory machine-readable medium including instructions for corrupted storage portion recovery in a memory device, the instructions, when executed by processing circuitry, cause the processing circuitry to perform operations comprising:
    detecting a failure event during a garbage collection operation on a collection of storage portions in a memory array, members of the collection of storage portions being moved from a former physical location to a new physical location by the garbage collection operation, the members of the collection of storage portions including user data that was transferred from a host to the memory device to be stored in the memory array, wherein the collection of storage portions is a block in a NAND device, and wherein a member of the collection of storage portions is a page;
    retrieving a reference to a former physical location of a possibly corrupt storage portion in the collection of storage portions in response to the failure event, the possibly corrupt storage portion including user data, the possibly corrupt storage portion having already been written to a new physical location, an entry for the possibly corrupt storage portion, in a logical-to-physical (L2P) mapping table, having been updated to map to the new physical location when the possibly corrupt storage portion was written to the new physical location, the reference to the former physical location being outside the L2P mapping table, wherein retrieving the reference to the former physical location of the possibly corrupt storage portion includes:
        identifying a second storage portion based on a physical relationship between the new physical location for the possibly corrupt storage portion and a new physical location of the second storage portion; and
        reading the former physical location of the possibly corrupt storage portion from the new physical location of the second storage portion; and
    rewriting the possibly corrupt storage portion at the new physical location using the user data from the former physical location to restore the user data in the possibly corrupt storage portion.

14. The non-transitory machine-readable medium of claim 13, wherein the operations comprise:
    identifying the second storage portion based on the physical relationship between the new physical location for the possibly corrupt storage portion and the new physical location of the second storage portion during an original write of the possibly corrupt storage portion for the garbage collection operation; and
    writing the former physical location of the possibly corrupt storage portion in the new physical location of the second storage portion.

15. The non-transitory machine-readable medium of claim 13, wherein identifying the second storage portion based on the physical relationship between the new physical location for the possibly corrupt storage portion and the new physical location of the second storage portion includes adding an offset to a page line of an address of the new physical location of the possibly corrupt storage portion.

16. The non-transitory machine-readable medium of claim 13, wherein identifying the second storage portion based on the physical relationship between the new physical location for the possibly corrupt storage portion and the new physical location of the second storage portion includes adding an offset to a NAND die of an address of the new physical location of the possibly corrupt storage portion.

17. The non-transitory machine-readable medium of claim 16, wherein identifying a second storage portion based on the physical relationship between the new physical location for the possibly corrupt storage portion and the new physical location of the second storage portion includes using a same plane in the offset to the NAND die.

18. The non-transitory machine-readable medium of claim 13, wherein reading the former physical location of the possibly corrupt storage portion from the new physical location of the second storage portion includes reading a spare area of a NAND page that is the new physical location of the second storage portion.

19. The memory controller of claim 1, wherein the failure event is asynchronous power loss during a program of a member of the collection of storage portions.

20. The memory controller of claim 1, wherein the failure event is a program fail of a member of the collection of storage portions.

21. The method of claim 7, wherein the failure event is asynchronous power loss during a program of a member of the collection of storage portions.

22. The method of claim 7, wherein the failure event is a program fail of a member of the collection of storage portions.

23. The non-transitory machine-readable medium of claim 13, wherein the failure event is asynchronous power loss during a program of a member of the collection of storage portions.

24. The non-transitory machine-readable medium of claim 13, wherein the failure event is a program fail of a member of the collection of storage portions.

* * * * *